United States Patent
Clum et al.

(10) Patent No.: US 10,519,782 B2
(45) Date of Patent: Dec. 31, 2019

(54) AIRFOIL HAVING SERPENTINE CORE RESUPPLY FLOW CONTROL

(71) Applicant: United Technologies Corporation, Farmington, CT (US)

(72) Inventors: Carey Clum, East Hartford, CT (US); Evan P. Molony, Farmington, CT (US); Charles Thistle, Middletown, CT (US); Dominic J. Mongillo, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 264 days.

(21) Appl. No.: 15/613,255

(22) Filed: Jun. 4, 2017

(65) Prior Publication Data

US 2018/0347376 A1  Dec. 6, 2018

(51) Int. Cl.
*F01D 5/18* (2006.01)
*F01D 5/08* (2006.01)
(Continued)

(52) U.S. Cl.
CPC .............. *F01D 5/187* (2013.01); *B22C 9/103* (2013.01); *B22C 9/24* (2013.01); *F01D 5/081* (2013.01);
(Continued)

(58) Field of Classification Search
CPC .......... F01D 5/187; F01D 9/041; F01D 25/12; F01D 5/081; F01D 2260/202;
(Continued)

(56) References Cited

U.S. PATENT DOCUMENTS 4,278,400 A * 7/1981 Yamarik ................. F01D 5/187 415/115
4,474,532 A * 10/1984 Pazder .................... F01D 5/187 415/115
(Continued)

FOREIGN PATENT DOCUMENTS

EP  1510653 A2 *  3/2005  ............... F01D 5/16
EP  2564029 A1  3/2013
(Continued)

OTHER PUBLICATIONS

European Search Report for European Application No. 18165635.8, International Filing Date Apr. 4, 2018, dated Mar. 6, 2019, 15 pages.

*Primary Examiner* — J. Todd Newton
(74) *Attorney, Agent, or Firm* — Cantor Colburn LLP

(57) ABSTRACT

Airfoils having a body with leading and trailing edges and a first serpentine cavity within the body enabling a cooling flow in a first direction within the airfoil body, a second serpentine cavity fluidly connected to the first serpentine cavity enabling a cooling flow in a second direction, and a third serpentine cavity fluidly connected to the second serpentine cavity enabling a cooling flow in at least one of the first direction or a third direction. A resupply cavity is fluidly connected to the third serpentine cavity to supply a resupply air to the third serpentine cavity, a junction at the location of the second serpentine cavity, the resupply cavity and the third serpentine cavity, and a flow control feature arranged to turn the serpentine cooling air from the second direction and/or prevent resupply air backflow.

19 Claims, 9 Drawing Sheets

(51) Int. Cl.
*F01D 9/04* (2006.01)
*F01D 25/12* (2006.01)
*B22C 9/10* (2006.01)
*B22C 9/24* (2006.01)

(52) U.S. Cl.
CPC ............ *F01D 9/041* (2013.01); *F01D 25/12* (2013.01); *F05D 2220/32* (2013.01); *F05D 2230/211* (2013.01); *F05D 2250/185* (2013.01); *F05D 2260/202* (2013.01)

(58) Field of Classification Search
CPC ........... F05D 2220/32; F05D 2250/185; F05D 2230/211; B22C 9/103; B22C 9/24
USPC .......................................................... 415/115
See application file for complete search history.

(56) References Cited

U.S. PATENT DOCUMENTS

| | | | | |
|---|---|---|---|---|
| 5,669,759 A * | 9/1997 | Beabout | .................. | F01D 5/187 416/97 R |
| 6,186,741 B1 | 2/2001 | Webb et al. | | |
| 6,234,753 B1 | 5/2001 | Lee | | |
| 6,969,230 B2 | 11/2005 | Shi et al. | | |
| 7,704,046 B1 * | 4/2010 | Liang | ...................... | F01D 5/187 416/96 R |
| 7,780,414 B1 * | 8/2010 | Liang | ...................... | B22C 9/10 164/369 |
| 7,918,647 B1 * | 4/2011 | Liang | ...................... | F01D 5/188 416/96 A |
| 8,231,350 B1 * | 7/2012 | Liang | ...................... | F01D 5/087 416/97 R |
| 8,864,467 B1 * | 10/2014 | Liang | ...................... | F01D 5/187 416/96 R |
| 9,376,921 B2 * | 6/2016 | Papple | .................... | F01D 5/081 |
| 2001/0016163 A1 * | 8/2001 | Tomita | .................... | F01D 5/186 416/193 A |
| 2006/0222493 A1 * | 10/2006 | Liang | ...................... | F01D 5/187 416/97 R |
| 2007/0140851 A1 * | 6/2007 | Hooper | ................... | F01D 5/187 416/97 R |
| 2007/0189897 A1 * | 8/2007 | Pietraszkiewicz | ...... | F01D 5/186 416/97 R |
| 2007/0189898 A1 * | 8/2007 | Hooper | ................... | F01D 5/187 416/97 R |
| 2010/0183428 A1 * | 7/2010 | Liang | ...................... | F01D 5/187 415/115 |
| 2010/0226789 A1 * | 9/2010 | Liang | ...................... | F01D 5/186 416/97 R |
| 2012/0082549 A1 * | 4/2012 | Ellis | ........................ | F01D 5/087 416/95 |
| 2012/0207614 A1 * | 8/2012 | Lee | ......................... | F01D 5/186 416/97 R |
| 2012/0269648 A1 * | 10/2012 | Lee | ......................... | F01D 5/187 416/97 R |
| 2012/0269649 A1 * | 10/2012 | Rawlings | ................ | F01D 5/187 416/97 R |
| 2013/0209268 A1 * | 8/2013 | Bregman | ................ | F01D 5/187 416/96 R |
| 2014/0169962 A1 * | 6/2014 | Lee | ......................... | F01D 5/186 416/1 |
| 2016/0194965 A1 * | 7/2016 | Spangler | ................ | F01D 5/187 415/115 |
| 2016/0376896 A1 | 12/2016 | Spangler et al. | | |
| 2017/0211396 A1 * | 7/2017 | Mongillo | ................ | F01D 5/187 |
| 2017/0234142 A1 * | 8/2017 | Benson | ................... | F01D 5/187 60/806 |
| 2018/0038232 A1 * | 2/2018 | Lee | ......................... | F01D 5/187 |
| 2018/0156045 A1 * | 6/2018 | Clum | ...................... | F01D 5/189 |
| 2018/0209277 A1 * | 7/2018 | Dooley | ................... | F01D 5/187 |

FOREIGN PATENT DOCUMENTS

| | | | | |
|---|---|---|---|---|
| EP | 3409886 A2 * | 12/2018 | ............ | B22C 9/103 |
| EP | 3441571 A1 * | 2/2019 | ............ | F01D 5/187 |
| GB | 2112468 A | 7/1983 | | |
| WO | WO-2016122478 A1 * | 8/2016 | ............ | F01D 5/186 |

* cited by examiner

AIRFOIL HAVING SERPENTINE CORE RESUPPLY FLOW CONTROL

STATEMENT REGARDING FEDERALLY SPONSORED RESEARCH OR DEVELOPMENT

This invention was made with government support under Contract No. DTFAWA-15-A-80010 awarded by the U.S. Federal Aviation Administration. The government has certain rights in the invention.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate trailing edge core geometries that include and/or require a resupply feed to provide additional cooling air to the trailing edge region. This is done by thickening a rib forward of a connection between a serpentine passage and a resupply source in order to angle the resupply air away from the exit of the serpentine. Such ribs can increase part weight and may create additional challenges associated with manufacturing producibility. Accordingly, improved means for providing cooling at a trailing edge region of an airfoil may be desirable.

BRIEF DESCRIPTION

According to some embodiments, airfoils for gas turbine engines are provided. The airfoil includes an airfoil body having a leading edge and a trailing edge, a first serpentine cavity formed within the airfoil body and defining a first portion of a serpentine cooling flow path and enabling a cooling flow in a first direction within the airfoil body, a second serpentine cavity fluidly connected to the first serpentine cavity and defining a second portion of the serpentine cooling flow path and enabling a cooling flow in a second direction, a third serpentine cavity fluidly connected to the second serpentine cavity and defining a third portion of the serpentine cooling flow path and enabling a cooling flow in at least one of the first direction or a third direction, wherein a serpentine cooling air flows through the serpentine cooling flow path, a resupply cavity fluidly connected to the third serpentine cavity and arranged to supply a resupply air to the third serpentine cavity, a junction defined at the location where both the second serpentine cavity and the resupply cavity fluidly connect to the third serpentine cavity, and a flow control feature located at the junction and arranged to at least one of (i) turn the serpentine cooling air from the second direction to at least one of the first or third direction or (ii) prevent the resupply air from flowing into the second serpentine cavity.

In addition to one or more of the features described herein, or as an alternative, further embodiments of the airfoils may include that the flow control feature defines a flow control cavity that fluidly connects the resupply cavity and the second serpentine cavity.

In addition to one or more of the features described herein, or as an alternative, further embodiments of the airfoils may include that the flow control cavity includes a first tapering cavity portion and a second tapering cavity portion and a cavity inflection point between the first and second tapering cavity portions, wherein each of the first and second tapering cavity portions expand in width in a direction away from the cavity inflection point.

In addition to one or more of the features described herein, or as an alternative, further embodiments of the airfoils may include that the first tapering cavity portion has a first width at a maximum thereof, a second width is defined at the cavity inflection point, and the second tapering cavity has a third width at a maximum thereof, wherein the first width and the second width are equal.

In addition to one or more of the features described herein, or as an alternative, further embodiments of the airfoils may include that the flow control feature includes a serpentine flow control subportion arranged to turn the serpentine cooling air into a direction substantially similar to a flow direction of the resupply air.

In addition to one or more of the features described herein, or as an alternative, further embodiments of the airfoils may include that the flow control feature includes a resupply flow control subportion arranged to prevent the resupply air from entering the second serpentine cavity.

In addition to one or more of the features described herein, or as an alternative, further embodiments of the airfoils may include at least one air ejection hole arranged to eject at least some of the serpentine cooling air to an external surface of the airfoil body.

In addition to one or more of the features described herein, or as an alternative, further embodiments of the airfoils may include that the at least one air ejection hole forms at least one of a gas path aperture or a platform aperture on the external surface of the airfoil body.

In addition to one or more of the features described herein, or as an alternative, further embodiments of the airfoils may include that the at least one air ejection hole is arranged at a position upstream of the resupply cavity along a flow path of the serpentine cooling air.

In addition to one or more of the features described herein, or as an alternative, further embodiments of the airfoils may include that the at least one air ejection hole is configured to eject at least thirty percent of the serpentine cooling air.

According to some embodiments, cores for manufacturing airfoils of gas turbine engines are provided. The cores include a first serpentine cavity core arranged to define a first serpentine cavity with a cooling flow in a first direction within a formed airfoil body, a second serpentine cavity core connected to the first serpentine cavity core and arranged to define a second serpentine cavity with a cooling flow in a second direction within the formed airfoil body, a third serpentine cavity core fluidly connected to the second serpentine cavity core and arranged to define a third serpentine cavity with a cooling flow in at least one of the first direction or a third direction within the formed airfoil body, a resupply cavity core connected to the third serpentine cavity core and arranged to form a resupply cavity in the formed airfoil body, wherein a core junction is defined at the location where the second serpentine cavity core and the resupply cavity core connect to the third serpentine cavity core, and a flow control feature core including a first tapering core portion and a second tapering core portion and a core inflection point between the first and second tapering core portions, wherein each of the first and second tapering core portions expand in thickness in a direction away from the core inflection point.

In addition to one or more of the features described herein, or as an alternative, further embodiments of the cores may include that the flow control feature core forms a structure that connects the resupply cavity core and the second serpentine cavity core.

In addition to one or more of the features described herein, or as an alternative, further embodiments of the cores may include that the first tapering core portion has a first core thickness at a maximum thereof, a second core thickness is defined at the core inflection point, and the second tapering core has a third core thickness at a maximum thereof, wherein the first core thickness and the third core thickness are equal.

In addition to one or more of the features described herein, or as an alternative, further embodiments of the cores may include that the flow control feature core includes a serpentine flow control core subportion arranged to form a structure in an airfoil body that turns a serpentine cooling air into a direction substantially similar to a flow direction of a resupply air.

In addition to one or more of the features described herein, or as an alternative, further embodiments of the cores may include that the flow control feature core includes a resupply flow control core subportion arranged to form a structure in an airfoil body that prevents a resupply air from entering a second serpentine cavity.

In addition to one or more of the features described herein, or as an alternative, further embodiments of the cores may include at least one ejection hole core arranged to form apertures within an airfoil body, the apertures enabling ejection of a portion of air from a second serpentine cavity.

In addition to one or more of the features described herein, or as an alternative, further embodiments of the cores may include that the at least one air ejection hole core is integrally formed with the core.

In addition to one or more of the features described herein, or as an alternative, further embodiments of the cores may include that the at least one air ejection hole core is arranged at a position forward of the resupply cavity core.

In addition to one or more of the features described herein, or as an alternative, further embodiments of the cores may include that the at least one air ejection hole core is configured to form an ejection hole that will eject at least thirty percent of a serpentine cooling air from a second serpentine cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
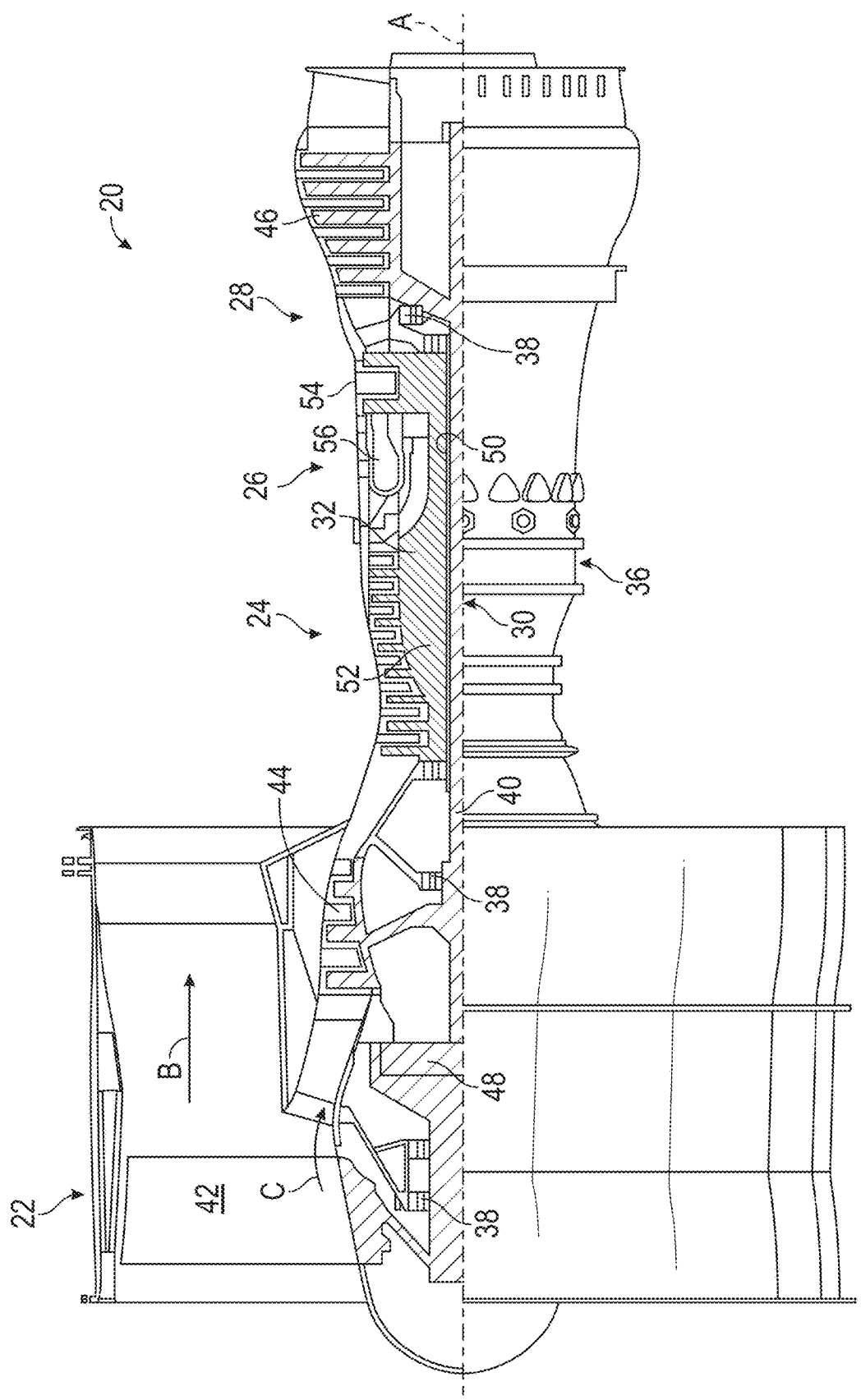
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
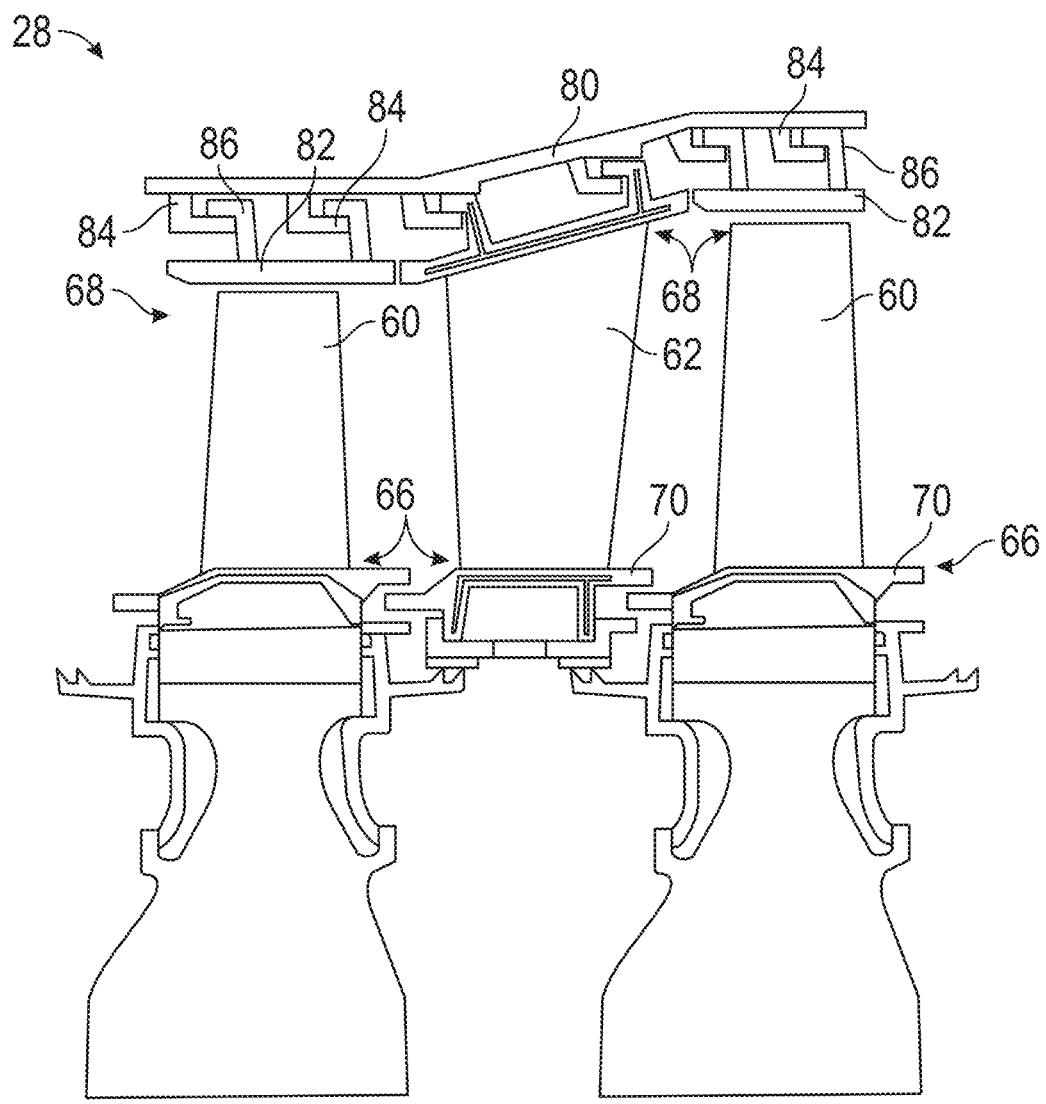
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities defining a number of channels or cores, hereinafter airfoil cores, formed therein and extending from an inner diameter 66 to an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

Figure 3:
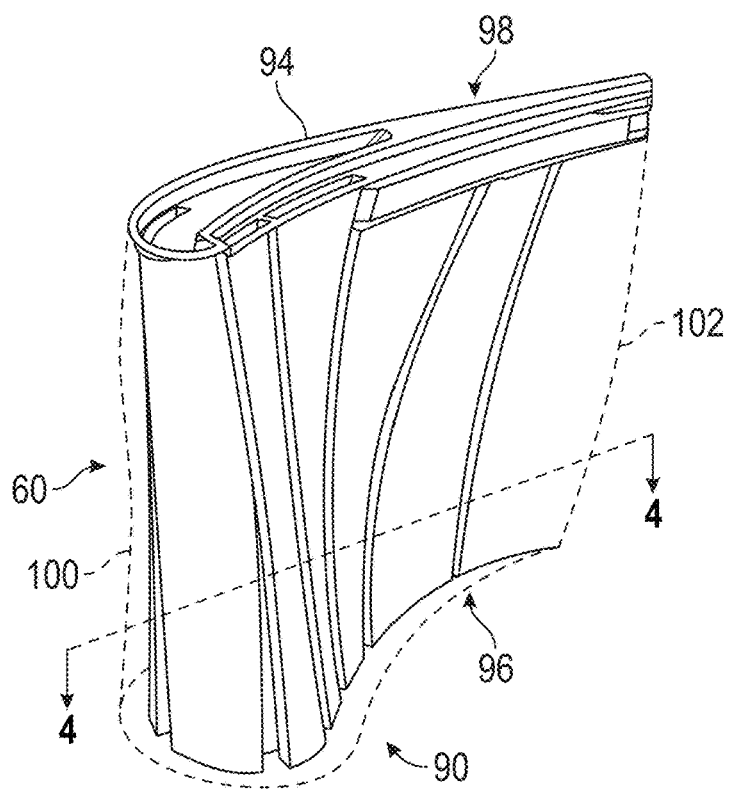
FIG. 3 is a perspective view of an airfoil that can incorporate embodiments of the present disclosure.
Figure 4:
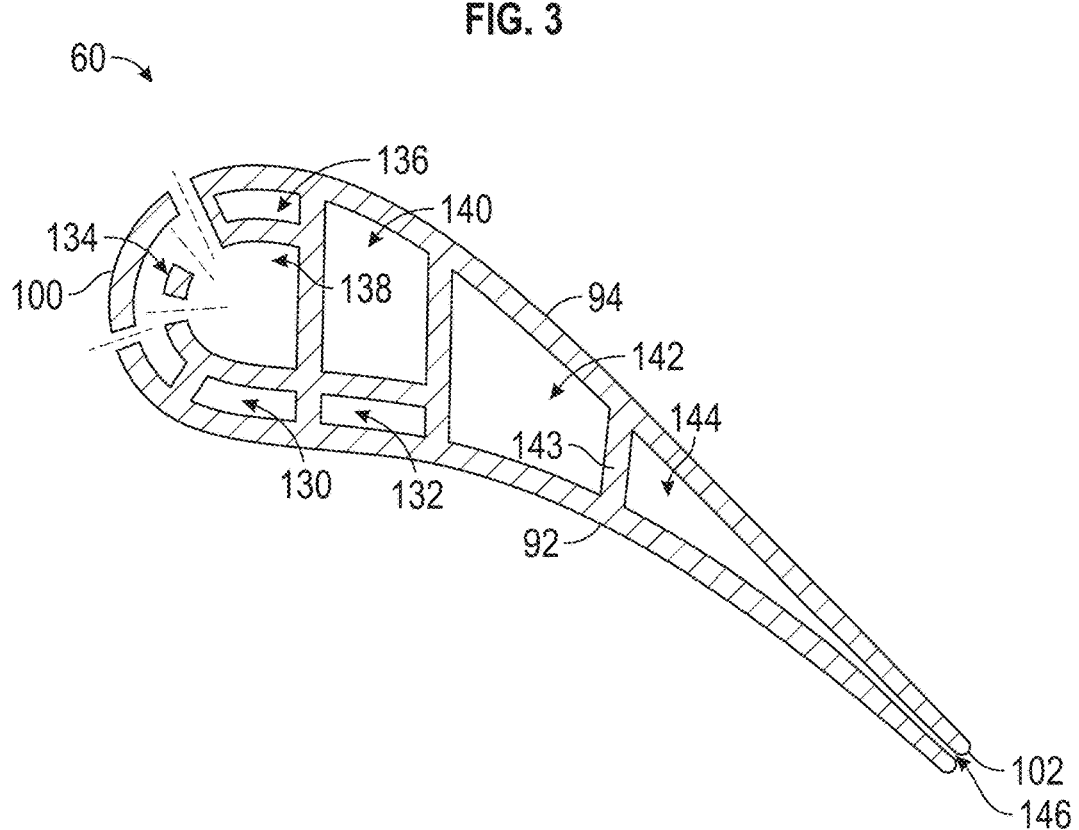
FIG. 4 is a partial cross-sectional view of the airfoil of FIG. 3 as viewed along the line 4-4 shown in FIG. 3.

As shown in FIGS. 3-4, the airfoil 60 includes an airfoil body 90 having a pressure side 92, a suction side 94, a root region 96, a tip region 98, a leading edge 100, and a trailing edge 102. The pressure side 92 is disposed opposite the suction side 94. The pressure side 92 and the suction side 94 each extend radially from the root region 96 to the tip region 98. As used herein, the term "radial" refers to radial with respect to an engine axis (e.g., engine central longitudinal axis A shown in FIG. 1). The pressure side 92 and the suction side 94 each extend generally axially and/or tangentially (e.g., with respect to the engine axis) between the leading edge 100 and the trailing edge 102. Each of the root region 96 and the tip region 98 extend from the leading edge 100 to the trailing edge 102 opposite each other at ends of the airfoil body 90 in the radial direction. That is, the root region 96 defines an inner radial end of the airfoil body 90 and the tip region defines an outer radial end of the airfoil body 90 (relative to an engine axis). The airfoil 60 may be a blade or vane, and have various other features associated with such configurations, e.g., platforms, tip surfaces, etc.

As shown in FIG. 4, illustrating a cross-sectional view of the airfoil 60 as viewed along the line 4-4 shown in FIG. 3, the airfoil body 90 defines or includes a plurality of internal cavities to enable cooling of the airfoil 60. For example, as shown, the airfoil 60 includes a plurality of forward and side cooling cavities 130, 132, 134, 136, 138. In the relative middle of the airfoil body 90, the airfoil 60 includes various serpentine flow cavities 140, 142, 144 and, at the trailing edge 102, a trailing edge slot 146. The most aftward third serpentine flow cavity 144 defines the last passage of the serpentine circuit, which is the trailing edge core cavity that fluidly connects to the trailing edge slot 146 that is formed at the trailing edge 102. In the present illustration, a first serpentine cavity 140 may arranged for flow in a first direction (e.g., an up pass cooling flow), a second serpentine cavity 142 may be arranged for flow in a second direction (e.g., a down pass cooling flow), and a third serpentine cavity 144 may be arranged for flow in the first direction and/or a third direction (e.g., an up pass cooling flow that exits the airfoil 60 through the trailing edge slot 146).

Although shown with a specific internal cooling cavity arrangement, airfoils in accordance with the present disclosure may include additional and/or alternative cavities, flow paths, channels, etc. as will be appreciated by those of skill in the art, including, but not limited to, tip cavities, serpentine cavities, trailing edge cavities, etc.

Airfoils, such as airfoil 60, may incorporate trailing edge core geometries that include and/or require a resupply feed to provide additional cooling air to the trailing edge region (e.g., third serpentine cavity 144). This is typically done by thickening a rib forward of a connection between a serpentine passage (e.g., divider rib 143 between the second and third serpentine flow cavities 142, 144 shown in FIG. 4). Further, the thickened rib 143 may be arranged forward relative to a resupply source in order to ensure the cooling air from the downward (radially inward) flowing cooling cavity 142 is positioned to ensure the resupply cooling air emanating from a resupply feed (see, e.g., resupply inlet 524 shown in FIG. 5) does not impede the cooling air flow within the serpentine flow cavities 140, 142. Additionally, may be desirable to orient the resupply feed in a favorable direction relative to the orientation of the cooling air flow of the serpentine that exits from the second serpentine cavity 142 into the third serpentine cavity 144. Such ribs can increase part weight and may create additional challenges associated with manufacturing producibility. Accordingly, improved means for providing cooling at a trailing edge region of an airfoil are provided in accordance with embodiments of the present disclosure.

Figure 5:
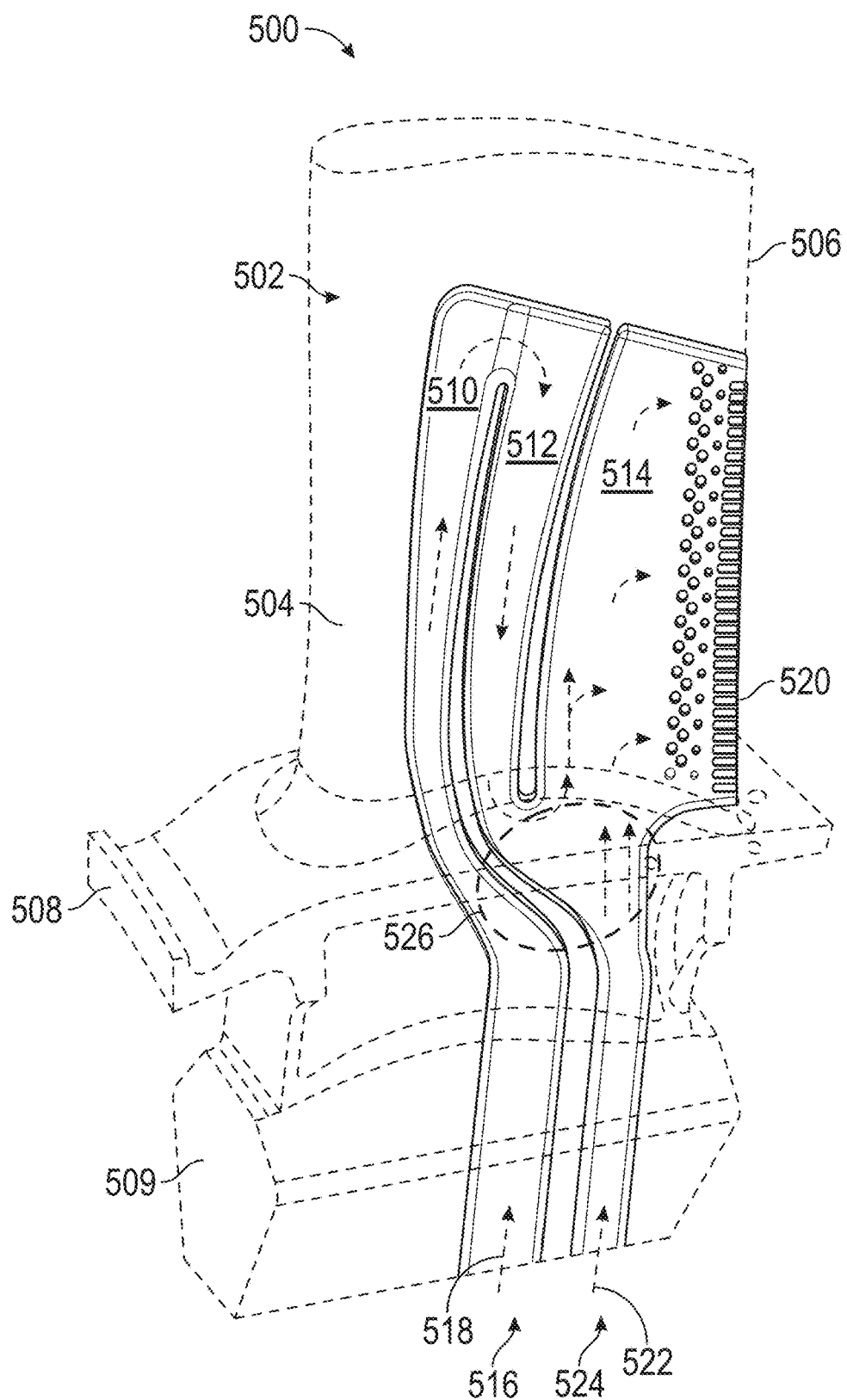
FIG. 5 is a schematic illustration of an airfoil in accordance with an embodiment of the present disclosure.

Embodiments of the present disclosure are directed to airfoils (blades, vanes, etc.) that includes serpentine cavity configuration having a trailing edge resupply having a structure including a "flow control feature." As used herein, the term "flow control feature" refers to a structural feature of the airfoil that restricts air flow in such a way that air entering through a resupply feed will not have sufficient pressure to direct cooling air flow backwards up a portion of the serpentine cavity (e.g., the second cavity or down pass shown in FIGS. 4-5). For example, this particular flow scenario would "back pressure" the second, down pass cavity 142 causing a significant decrease in the internal cooling mass flow rate and Reynolds number, thereby reducing the internal convective heat transfer and thermal cooling efficiency required to achieve durability thermal cooling effectiveness requirements.

Turning now to FIG. 5, a schematic illustration of an airfoil 500 having an airfoil body 502 with a leading edge 504 and a trailing edge 506 is shown. In the present illustrative example, the airfoil 500 is shown as a blade with the airfoil body 502 extending from a platform 508. The platform 508 is arranged to connect to or otherwise attach to a rotor disc for operation within a gas turbine engine by means of attachment 509 (which may be integral or separate from the airfoil body 508). In some non-limiting arrangements, the platform 508 and attachment 509 may be integrally formed with the rotor disc, or in some embodiments the attachment 509 may be integral with a rotor disc and the platform 508 may be attached to the attachment 508. The airfoil body 502 and the platform 508 include internal cooling passages and cavities that are arranged to enable cooling air to flow through the internal portions of the airfoil 500 to provide cooling during operation. Illustratively shown in FIG. 5 is a serpentine cavity including cavities 510, 512, 514, which each define a portion of a serpentine cooling flow path. A first serpentine cavity 510 is an up pass cavity, as illustratively shown, with a serpentine inlet 516 supplying serpentine cooling air 518 through the platform 508 and into the airfoil body 502. The serpentine cooling air 518 flows upward (e.g., radially outward when installed within a gas turbine engine) through the first serpentine cavity 510. The serpentine cooling air 518 then turns and flows downward (radially inward) through a second serpentine cavity 512. The serpentine cooling air 518 then will turn again and flow upward (radially outward) into and through a third serpentine cavity 514. The serpentine cooling air 518 will then exit the airfoil 500 through one or more trailing edge slots 520 at the trailing edge 506.

As the serpentine cooling air 518 flows through the serpentine cavities 510, 512, 514 the air will absorb heat from the material of the airfoil body 502. Accordingly, the cooling efficiency of the serpentine cooling air 518 will decrease as the air moves through the serpentine cavities 510, 512, 514. To improve cooling efficiency toward the trailing edge 506 of the airfoil 500, e.g., within the third serpentine cavity 514, resupply air 522 can be introduced into the airfoil 500 through a resupply inlet 524 that is formed within the attachment 509. The resupply air 522 will interact with the serpentine cooling air 518 at a junction 526 within the airfoil 500, as shown in FIG. 5.

When the resupply air 522 enters the junction 526, the resupply air 522 may have a higher pressure than the serpentine cooling air 518 entering the junction 526. Such pressure difference may cause the resupply air 522 to travel up (radially outward) within the second serpentine cavity 512 which can disrupt and/or reduce the effective cooling and airflow as it passes through the serpentine cavities 510, 512, 514.

In accordance with embodiments of the present disclosure, an airfoil is formed with a flow control feature that is located at the junction (e.g., junction 526 shown in FIG. 5). The flow control feature in accordance with embodiments of the present disclosure is arranged to reduce the volume/area within the airfoil body (e.g., within the flow cavities) that resupply air can travel through effectively. That is, the flow control feature reduces the pressure of the resupply air and prevents the resupply air from flowing in an undesired direction. Further, the geometry of the flow control feature in accordance with embodiments of the present disclosure can be arranged such that a taper (e.g., a narrowing structure) on the serpentine side (e.g., proximate the exit of the second serpentine cavity) can be gradual to allow for the serpentine cooling air to have low loss and collect a dynamic head when interacting with the resupply air. As such airfoils formed with flow control features of the present disclosure and described below may have serpentine cooling air that is total-pressure-driven and the resupply is static-pressure-driven (in the direction of the second serpentine cavity), resulting in a reduction in the amount of back pressuring from the resupply air at the location of the flow control feature.

Figure 6:
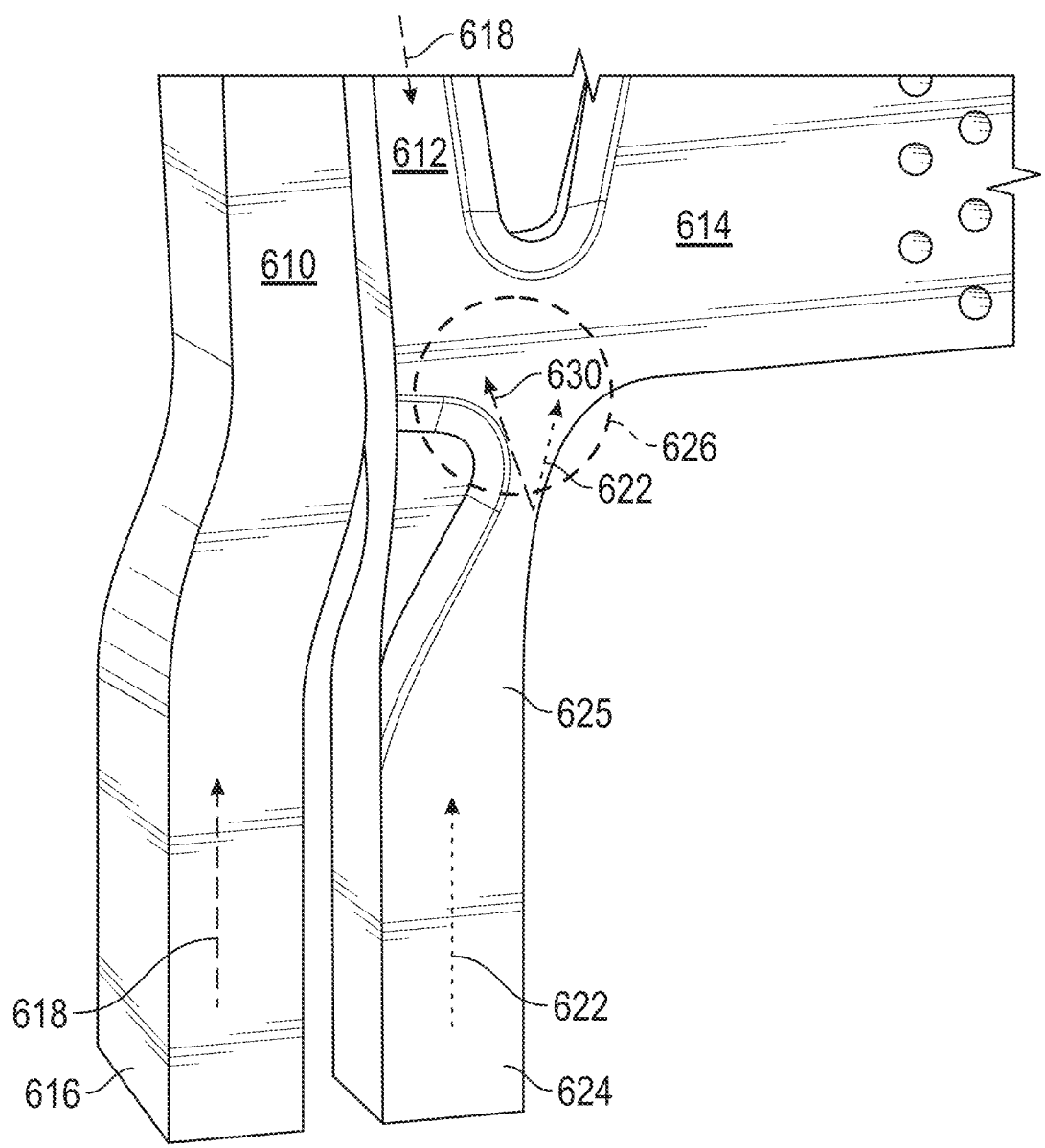
FIG. 6 is a schematic illustration of airflow through cavities of an airfoil in accordance with an embodiment of the present disclosure.

Turning now to FIG. 6, a schematic illustration of airflow through cavities of an airfoil in accordance with an embodiment of the present disclosure is shown. Illustratively, the structure shown represents the walls of cooling cavities within an airfoil, and the structure and shape of the airfoil is omitted from FIG. 6 for ease of understanding. As shown, a serpentine inlet 616 supplies serpentine cooling air 618 into a first serpentine cavity 610 which flows into a second serpentine cavity 612 (with the turn not shown). The serpentine cooling air 618 will enter a third serpentine cavity 614 at a junction 626, similar to that shown and described above. Resupply air 622 is provided from a resupply inlet 624, the resupply air 622 providing cold air to the third serpentine cavity 614. As shown, the resupply air 622 enters through the resupply inlet 624, flows through a resupply cavity 625, and into the junction 626 and the third serpentine cavity 614. In some embodiments, the resupply air 622 and the serpentine cooling air 618 can mix to re-cool the serpentine cooling air 618 after the serpentine cooling air 618 has heated up during passage through the first and second serpentine cavities 610, 612.

Although it may be beneficial to cool the serpentine cooling air 618 at the junction 626 by mixing with the resupply air 622, it may not be efficient to have a portion of the resupply air 622 to backflow into the second serpentine cavity 612, shown as backflow air 630. Accordingly, as shown, the junction 626 is arranged with a flow control feature 628. The flow control feature 628 can have a cross sectional flow area that is defined to incorporate variable rates of flow cavity area convergence/divergence (e.g., taper/expansion) and blending to better tailor the transition and size of the flow control feature 628. Optimization of the flow control feature 628 can substantially prevent backflow air 630 from forming by effectively controlling the pressure differential between the serpentine cooling air 618 and the resupply air 622. The flow control feature 628 can restrict a cross-sectional area of the serpentine cavity at the junction 626 such that the resupply air 622 will not flow into the second serpentine cavity 612.

Figure 7A:
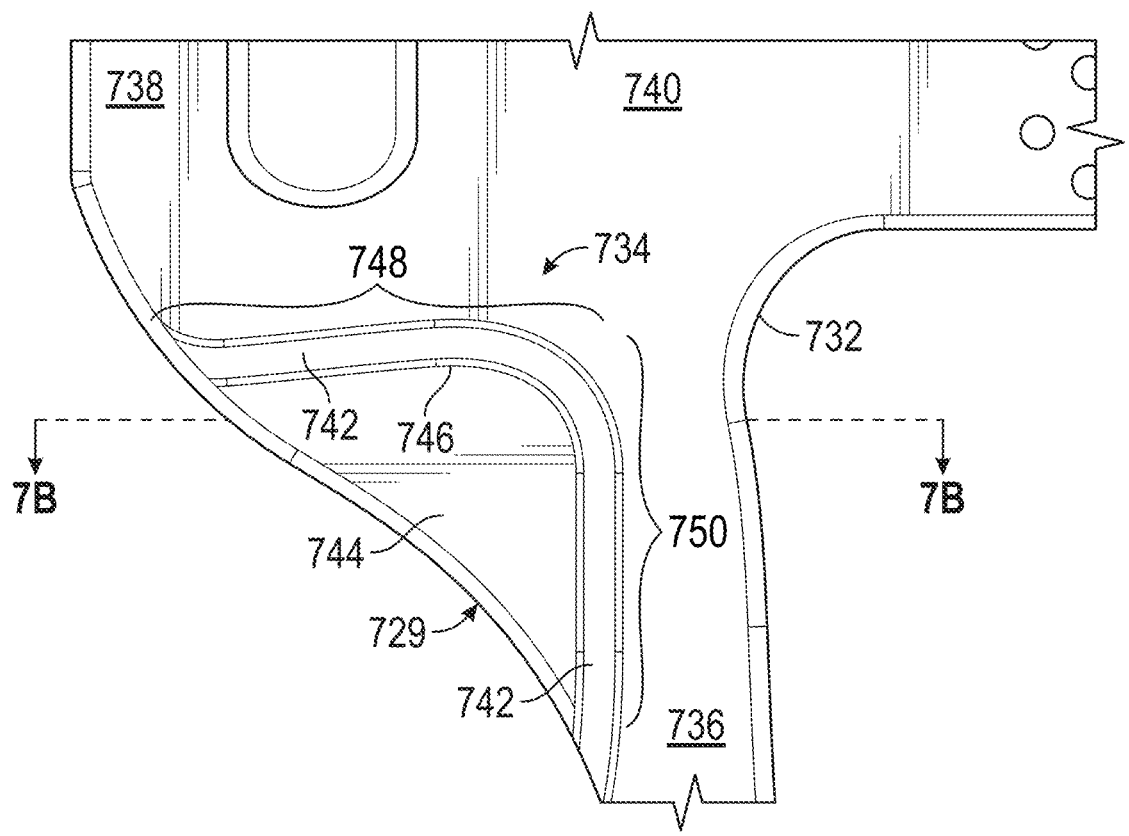
FIG. 7A is an illustrative side view of a core junction in accordance with an embodiment of the present disclosure.
Figure 7B:
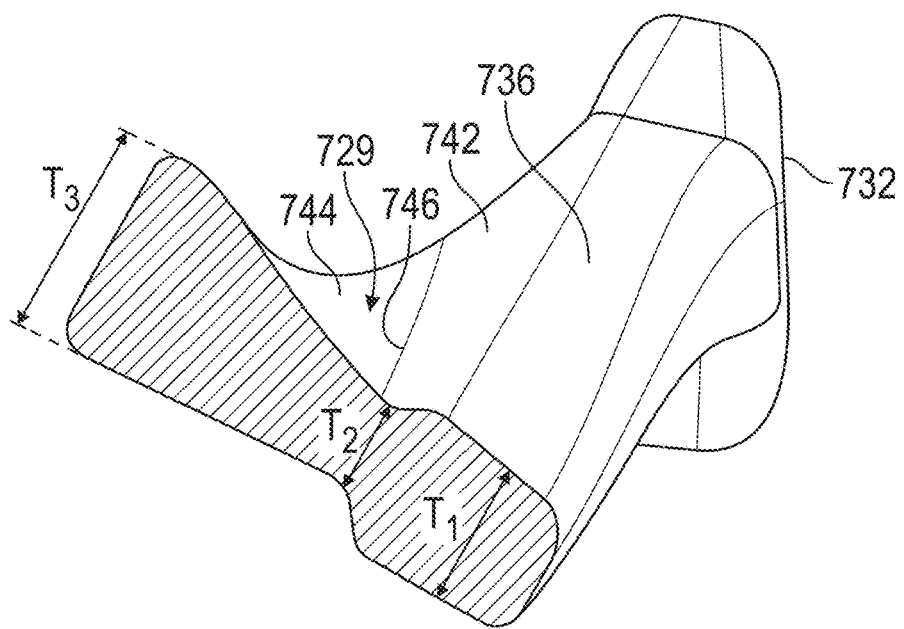
FIG. 7B is a cross-sectional illustration of the core junction of FIG. 7A as viewed along the line B-B shown in FIG. 7A.

Turning now to FIGS. 7A-7B, schematic illustrations of a portion of a core 732 used to form an airfoil having a flow control feature core 729 in accordance with embodiments of the present disclosure are shown. FIG. 7A is an illustrative side view of a core junction 734 where a resupply cavity core 736 and a second serpentine cavity core 738 meet to form the junction of the airfoil as shown and described above. The core 732 also includes a third serpentine cavity core 740, forming an additional portion of the core junction 734. FIG. 7B is a cross-sectional view of the core 732 as viewed along the line B-B shown in FIG. 7A.

As shown, the flow control feature core 729 extends between the resupply cavity core 736 and the second serpentine cavity core 738. The flow control feature core 729 includes a first tapering core portion 742 that defines a section of the core 732 that extends from the resupply cavity core 736, the second serpentine cavity core 738, or the third trailing edge serpentine cavity core 740 in a narrowing fashion relative to a first core thickness $T_1$, as shown in FIG. 7B. Each of the resupply cavity core 736, the second serpentine cavity core 738, and the third serpentine cavity core 740 have the first core thickness $T_1$. The first tapering core portion 742 of the flow control feature core 729 tapers to a core inflection point 746 that has a second core thickness $T_2$, which may be a minimum thickness of the core 732, at least with respect to the area of the core 732 at the core junction 734. The flow control feature core 729 includes a second tapering core portion 744 that widens in thickness to a third core thickness $T_3$ extending away from the second core thickness $T_2$. In some embodiments, the third core thickness $T_3$ may be equal to the first core thickness $T_1$, however embodiments of the present disclosure are not so limited, and the first and third core thicknesses $T_1$, $T_3$ may be different. The core thicknesses $T_1$, $T_2$, $T_3$ define a thickness profile of the core 732 at the core junction 734. Accordingly, the transition between the core thicknesses $T_1$, $T_2$, $T_3$ can be linear, curvilinear, concave, convex, and/or smooth, and may be dependent on specific internal core geometry features and the relative relationship and/or orientation of specific features in the region of the core junction 734.

As shown in FIG. 7A, the first tapering core portion 742 of the flow control feature core 729 defines a geometric shape or contour that can be predefined or configured to control air flow through an airfoil formed using the core 732. For example, the first tapering core portion 742 may include a serpentine flow control core subportion 748 that is arranged to form a restrictive core cavity "wall" within the root turn airfoil region that can assist the turning of airflow passing from a second serpentine cavity into a third serpentine cavity (e.g., proximate the junction 526 shown in FIG. 5). Similarly, a resupply flow control core subportion 750 is arranged to form a restrictive core cavity "wall" within the root turn airfoil region that can assist directing the resupply air directly into the third serpentine cavity (e.g., proximate the junction 526 shown in FIG. 5). The serpentine flow control core subportion 748 and the resupply flow control core subportion 750 can define a continuous linear, curvilinear, and/or smooth contour, surface, or shape that meet proximate the third serpentine cavity core 740.

Figure 8:
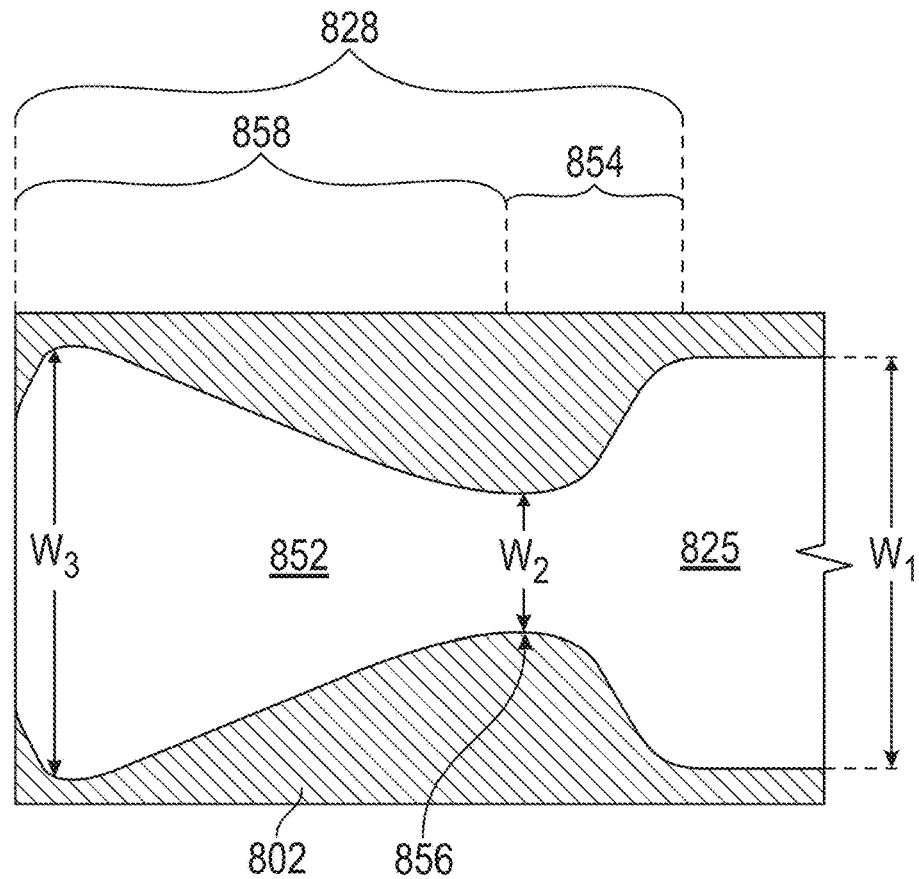
FIG. 8 is a schematic illustration of a flow control feature of an airfoil in accordance with an embodiment of the present disclosure.

Turning now to FIG. 8, a schematic illustration of a cross-sectional view of a flow control feature 828 of an airfoil body 802 in accordance with an embodiment of the present disclosure is shown. As shown in FIG. 8, the airfoil body 802 includes internal cavities, including a resupply cavity 825 (similar to resupply cavity 625 shown in FIG. 6). The flow control feature 828 defines a flow control cavity 852 within the airfoil body 802. The flow control cavity 852 has a tapering shape that is defined by the thickness profile of the flow control feature core that forms the cavities (e.g., core thicknesses $T_1$, $T_2$, $T_3$ shown in FIG. 7). Accordingly, the flow control cavity 852 has a first width $W_1$ that is a maximum at a first tapering cavity portion 854.

The first tapering cavity portion 854 of the flow control feature 828 tapers to a cavity inflection point 856 that has a second width $W_2$, which may be a minimum width or bottleneck of the flow control cavity 852. The flow control cavity 852 is further defined by a second tapering cavity portion 858 that widens or expands in width from the second width cavity inflection point 856 to a third width $W_3$. In some embodiments, the third width $W_3$ may be equal to the first width $W_1$, however embodiments of the present disclosure are not so limited, and the first and third widths $W_1$, $W_3$ may be different. The widths $W_1$, $W_2$, $W_3$ define a cavity profile of the flow control cavity 852 within the airfoil body 802. Although shown illustratively in FIG. 8 as linear features with simple fillet blends, it is to be understood that the transition and blend regions of embodiments of the presents disclosure may be linear, curvilinear, concave, convex, and/or smooth and may be dependent on specific internal core geometry features and the relative relationship/orientation of specific features in the region of the core junction (e.g., proximate the junction 526 shown in FIG. 5).

Figure 9:
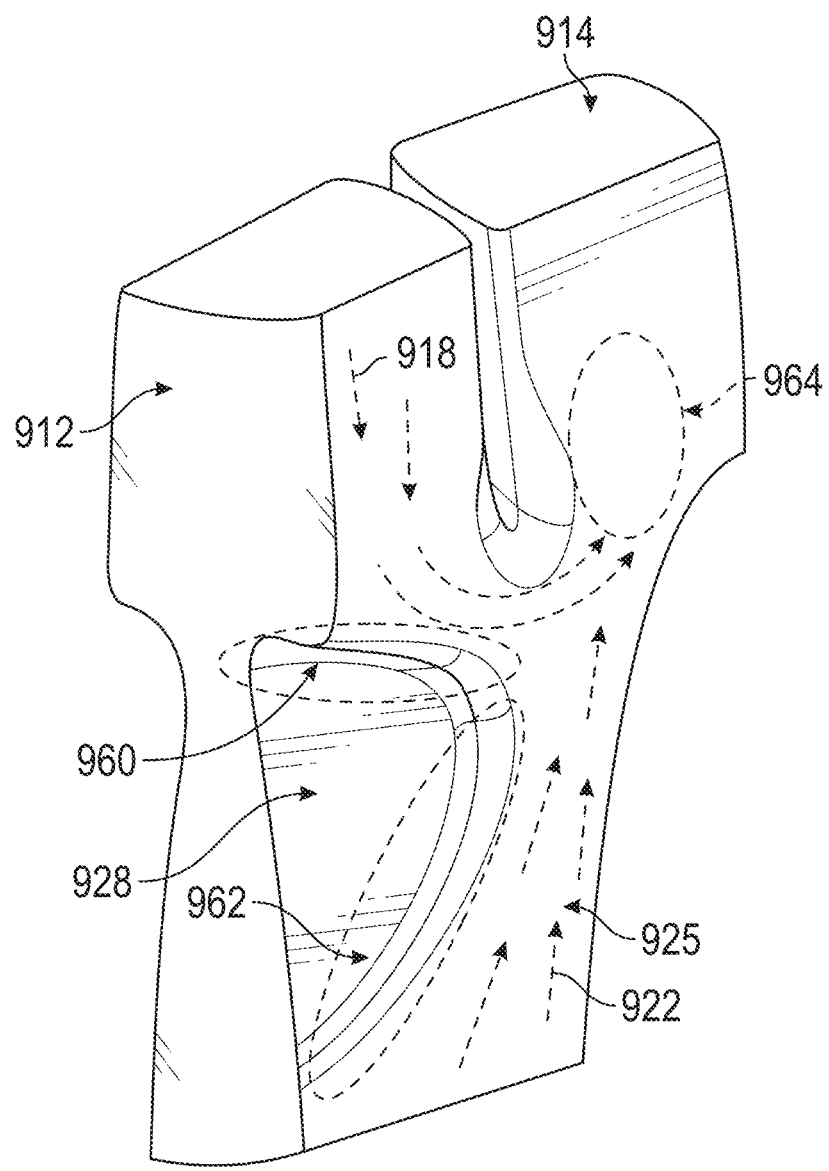
FIG. 9 is a schematic illustration of airflow control as achieved in an airfoil having a flow control feature in accordance with an embodiment of the present disclosure.

Turning now to FIG. 9, a schematic illustration of airflow control as achieved in an airfoil having a flow control feature 928 in accordance with an embodiment of the present disclosure is shown. As noted above, the flow control features of the present disclosure can prevent improper flow direction of resupply air. However, flow control features in accordance with embodiments of the present disclosure can provide other properties, including flow control related to merging of flows within a third serpentine cavity 914. As shown in FIG. 9, serpentine cooling air 918 flows radially inward (downward on the page) within a second serpentine cavity 912, as described above. The radially inward flowing serpentine cooling air 918 will interact with the flow control feature 928 along a serpentine flow control subportion 960, e.g., the bottleneck within a flow control cavity as shown and described with respect to FIG. 8. The serpentine flow control subportion 960 is arranged to direct the serpentine cooling air 918 into a turn such that the flow of serpentine cooling are 918 will travel in a substantially radially outward (up on the page) when entering the third serpentine cavity 914. As shown, the flow control feature 928 also includes a resupply flow control subportion 962 that is arranged to ensure radially outward flow of resupply air 922 within a resupply cavity 925. Accordingly, when the resupply air 922 and the turned serpentine cooling air 918 merge within a merging region 964 of the third serpentine cavity 914 the two air flows are flowing in substantially the same streamwise direction and thus losses due to merging of the two air flows are reduced.

As discussed above, the serpentine cooling air will be heated as it flows through, at least, the first and second serpentine cavities. In some embodiments, as described above, to re-cool this air, the serpentine cooling air is mixed with resupply air at a junction proximate the trailing edge (e.g., third serpentine cavity). The relative momentum mixing loss between the two separate serpentine and resupply flows may be further minimized and/or improved by effectively creating a "jet pump" in which the resupply flow 925 is accelerated and ejected at significantly higher velocity than the velocity of the serpentine cooling air 918. The streamwise directions of the two merged flows are predominately in the same relative direction and are essentially parallel. In this sense, the resupply flow 925 serves as an ejector thereby accelerating the lower velocity flow of the serpentine cooling air 918. Further, in this sense, the serpentine mass flow rate will be increased, thereby improving the internal convective cooling characteristics of the first and second serpentine cavities.

Additionally, the flow capacity of the serpentine cavities may be further increased through ejecting and/or purging a portion of the serpentine cooling air through platform and/or airfoil film cooling holes and/or under platform rim cavity holes from a location upstream of the junction and/or merging region 964. The "bleed off" (e.g., ejection and/or purge) of serpentine cooling flow may also provide a more favorable pressure differential. In this instance, the flow capacity of the serpentine cavities can be increased, resulting in a reduction in the cooling air heat pickup and improved convective thermal cooling effectiveness.

That is, in accordance with some embodiments, a fraction or portion of the "hot" serpentine cooling air in the serpentine cavities can be ejected or dumped out the platform (e.g., into a hot gas path or elsewhere). In some arrangements, the airfoil platform may utilize either airfoil core fed cooling air or "poor man" fed cooling air from secondary leakage flow systems. However, embodiments disclosed herein may provide the ejected serpentine cooling air to film cool the platform, such as within the hot gas path of a turbine section of a gas turbine engine. The volume of serpentine cooling air that is ejected/dumped to the platform can be replaced by dedicated cold air (e.g., resupply air) through a resupply cavity, such as that described above. Accordingly, the combination achieved in the presently described configuration can allow for the optimization of cooling air temperature in a trailing edge circuit (e.g., third serpentine cavity and trailing edge slots). Further, such embodiments can enable a reduction in trailing edge pressures and/or reduce total required cooling air. In operation, a portion or fraction of the serpentine cooling air can dump out of the trailing edge slot, and as such, any cooling air used for the airfoil is used for meeting life requirements and is not just to purge the internal cavities of the airfoil.

Figure 10:
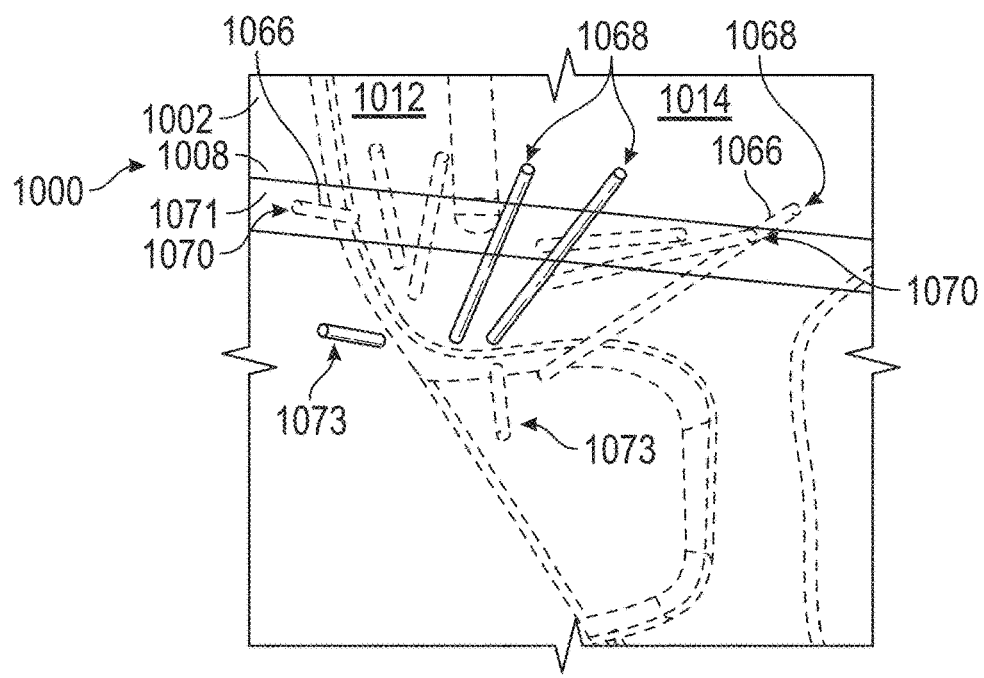
FIG. 10 is a partial schematic illustration of an airfoil in accordance with an embodiment of the present disclosure.
Figure 11:
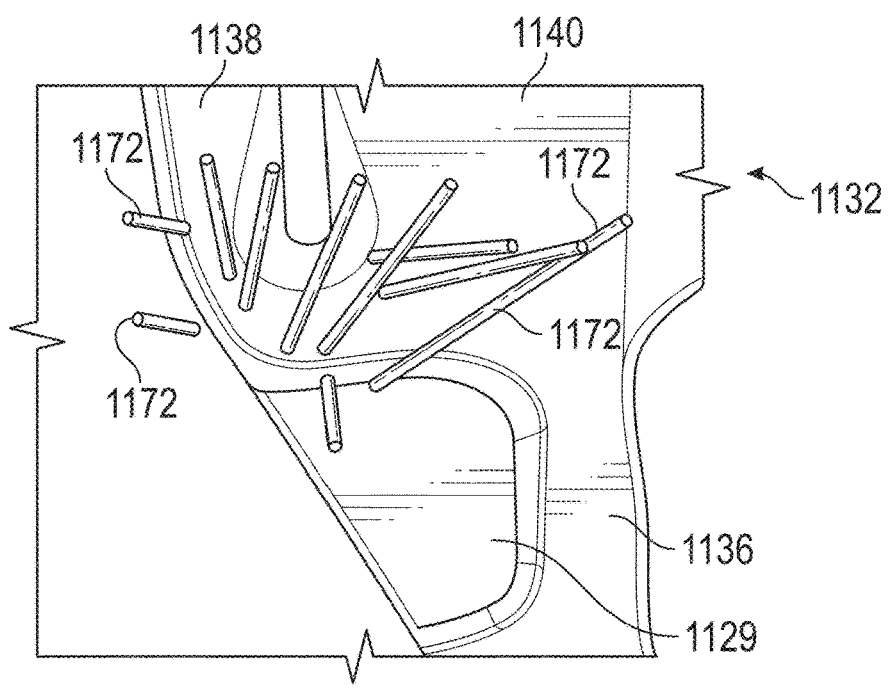
FIG. 11 is a partial schematic illustration of a core used to form the airfoil shown in FIG. 10, in accordance with an embodiment of the present disclosure.

Turning now to FIGS. 10-11, schematic illustrations of an airfoil 1000 and core 1132 to form the airfoil 1002 are shown, respectively. As shown, the airfoil 1000 has an airfoil body 1002 that extends from a platform 1008. The airfoil body 1002 has various internal cavities (formed using the core 1132) including a second serpentine cavity 1012 and a third serpentine cavity 1014, similar to embodiments shown and described above. The serpentine cavities 1012, 1014 are defined in a manufacturing process by the structure of the core 1132. As shown in FIG. 11, the core 1132 a second serpentine cavity core 1138, a third serpentine cavity core 1140, and a resupply cavity core 1136, with some features discussed above not shown for simplicity. The core 1132 further includes a flow control feature core 1129, similar to that shown and described above, that forms a flow control feature within the airfoil 1000. Although shown with a limited number of cores in a particular configuration, those of skill in the art will appreciate that other cores, core components, and/or other configurations may be included without departing from the scope of the present disclosure.

In the present embodiment, the airfoil 1000 includes air ejection holes 1066 that are fluidly connected at the end of the second serpentine cavity 1012 with an external surface of the airfoil body 1002 and/or the platform 1008, as schematically shown. The air ejection holes 1066 include apertures located on the external surfaces of the airfoil body 1002 and/or the platform 1008 and the air flow out of the air ejection holes 1066 may be used to cool the external platform and/or airfoil surfaces by providing film cooling to reduce locally high external heat flux. As shown, the air ejection holes 1066 can include gas path apertures 1068 and platform apertures 1070. The air ejected through the gas path apertures 1068 may form a film cooling along a gas path surface of the airfoil body 1002 and/or the platform 1008. The platform apertures 1070 may eject air from the internal cavities into non-gas path locations, such as along non-gas path portions of the platform 1008 (e.g., matefaces between adjacent platforms). Additionally, under-platform apertures 1073 may be incorporated to provide purge air under a platform rim 1071 (e.g., under-platform rim cavity area) in order to reduce blade/airfoil attachment and/or neck temperatures. Such under-platform apertures 1073 can mitigate possible environmental contaminates that may coalesce in regions of stagnant or recirculating flow fields, which may result in premature durability failure modes.

As shown in FIG. 11, the core 1132 includes ejection hole cores 1172. The ejection hole cores 1172 are arranged or positioned relative to the core 1132 or portions thereof to enable formation of the air ejection holes 1066 within an airfoil (e.g., airfoil 1000). The ejection hole cores 1172 can be integrally formed with an airfoil core structure and thus integrally formed during an airfoil manufacturing processor. Alternatively, in some embodiments, the ejection hole cores 1172 may be separate elements that are attached to or otherwise placed appropriately relative to an airfoil core during a manufacturing process. That is, in some embodiments, the ejection hole cores 1172 can be integrally formed with the core 1132 and, in other embodiments, the ejection hole cores 1172 may be separate components that are attached or placed relative to the core 1132 during a manufacturing process.

In other embodiments, the ejection hole cores 1172 can be eliminated entirely. In some such embodiment, the air ejection holes 1066 can be formed in a post machining process that is applied to a formed airfoil/platform/attachment, etc. Such post machining process can include, but is not limited to, laser drilling, conventional electrical discharge machining ("EDM"), high speed EDM, electrochemical machining, laser ablation, micro water jet, water jet with laser assist, etc. In such arrangements, the ejection hole cores 1172 shown schematically in FIG. 11 demonstrate the location where the air cooling holes would be formed relative to the core 1132.

In one non-limiting example, the air ejection holes 1066 can be designed (e.g., aperture, size, length, diameter, number, location, etc.) to eject between 1% and 75% of the serpentine cooling air flow, thus enabling a similar proportion of resupply cooling air flow to be provided by the resupply cavity at the third serpentine cavity and/or trailing edge slot. In some non-limiting embodiments, the air ejection holes are arranged to eject between 1% and 75% of the serpentine cooling air. Such arrangement can provide a significant impact on the coolant temperature supplying the third serpentine (trailing edge) cavity and trailing edge discharge apertures. To achieve a desired percentage or portion of ejected serpentine air, the number, arrangement, angling, size, shape, internal geometry, etc. of the air ejection holes can be appropriately configured to achieve such results.

In accordance with some embodiments, and as schematically shown, the arrangement and placement of the air ejection holes 1066 can be positioned forward (toward a leading edge of the airfoil 1000) relative to the resupply cavity (formed by the resupply cavity core 1136). As such, the ejection of the serpentine cooling air will occur upstream of the resupply air being supplied into the third serpentine cavity. Advantageously, such arrangement can enable the platform 1008 being supplied with relatively cold air (e.g., ejected serpentine cooling air) and the coolant temperature within the trailing edge cavity (e.g., third serpentine cavity and trailing edge slot) can be customized to a large extent based off of how much serpentine cooling air is pulled off or ejected from the circuit upstream of the flow control feature and resupply air introduction.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
   an airfoil body having a leading edge and a trailing edge, the airfoil body defining an axial direction from the leading edge to the trailing edge, a radial direction from a root to a tip, and a circumferential direction from a pressure side to a suction side;
   a first serpentine cavity formed within the airfoil body and defining a first portion of a serpentine cooling flow path and enabling a cooling flow in a first direction within the airfoil body;
   a second serpentine cavity fluidly connected to the first serpentine cavity and defining a second portion of the serpentine cooling flow path and enabling a cooling flow in a second direction;
   a third serpentine cavity fluidly connected to the second serpentine cavity and defining a third portion of the serpentine cooling flow path and enabling a cooling flow in at least one of the first direction or a third direction, wherein a serpentine cooling air flows through the serpentine cooling flow path;
   a resupply cavity fluidly connected to the third serpentine cavity and arranged to supply a resupply air to the third serpentine cavity;
   a junction defined at the location where both the second serpentine cavity and the resupply cavity fluidly connect to the third serpentine cavity; and
   a flow control feature located at the junction and arranged to at least one of (i) turn the serpentine cooling air from the second direction to at least one of the first or third direction or (ii) prevent the resupply air from flowing into the second serpentine cavity, wherein the flow control feature defines a tapering flow control cavity that narrows in the circumferential direction to form one or more tapering portions to turn the serpentine cooling air and/or prevent the resupply air from flowing into the second serpentine cavity.

2. The airfoil of claim 1, wherein the tapering flow control cavity fluidly connects the resupply cavity and the second serpentine cavity.

3. The airfoil of claim 2, the tapering flow control cavity including a first tapering cavity portion and a second tapering cavity portion and a cavity inflection point between the first and second tapering cavity portions, wherein each of the first and second tapering cavity portions expand in width in a direction away from the cavity inflection point.

4. The airfoil of claim 3, wherein the first tapering cavity portion has a first circumferential width at a maximum thereof, a second circumferential width is defined at the cavity inflection point, and the second tapering cavity portion has a third circumferential width at a maximum thereof, wherein the first circumferential width and the second circumferential width are equal.

5. The airfoil of claim 1, wherein the flow control feature includes a serpentine flow control subportion extending in the axial direction and arranged to turn the serpentine cooling air into a direction substantially similar to a flow direction of the resupply air.

6. The airfoil of claim 1, wherein the flow control feature includes a resupply flow control subportion extending at least partially in the radial direction and arranged to prevent the resupply air from entering the second serpentine cavity.

7. The airfoil of claim 1, further comprising at least one air ejection hole arranged to eject at least some of the serpentine cooling air to an external surface of the airfoil body.

8. The airfoil of claim 7, wherein the at least one air ejection hole forms at least one of a gas path aperture or a platform aperture on the external surface of the airfoil body.

9. The airfoil of claim 7, wherein the at least one air ejection hole is arranged at a position upstream of the resupply cavity along a flow path of the serpentine cooling air.

10. The airfoil of claim 7, wherein the at least one air ejection hole is configured to eject at least thirty percent of the serpentine cooling air.

11. A core assembly for manufacturing an airfoil of a gas turbine engine, the core assembly comprising:
a first serpentine cavity core arranged to define a first serpentine cavity with a cooling flow in a first direction within a formed airfoil body, the formed airfoil body defining an axial direction from a leading edge to a trailing edge, a radial direction from a root to a tip, and a circumferential direction from a pressure side to a suction side;
a second serpentine cavity core connected to the first serpentine cavity core and arranged to define a second serpentine cavity with a cooling flow in a second direction within the formed airfoil body;
a third serpentine cavity core fluidly connected to the second serpentine cavity core and arranged to define a third serpentine cavity with a cooling flow in at least one of the first direction or a third direction within the formed airfoil body;
a resupply cavity core connected to the third serpentine cavity core and arranged to form a resupply cavity in the formed airfoil body, wherein a core junction is defined at the location where the second serpentine cavity core and the resupply cavity core connect to the third serpentine cavity core; and
a flow control feature core including a first tapering core portion that narrows in the circumferential direction and a second tapering core portion that narrows in the circumferential direction and a core inflection point between the first and second tapering core portions, wherein each of the first and second tapering core portions expand in thickness in a direction away from the core inflection point.

12. The core of claim 11, wherein the flow control feature core forms a structure that connects the resupply cavity core and the second serpentine cavity core.

13. The core of claim 11, wherein the first tapering core portion has a first core thickness in the circumferential direction at a maximum thereof, a second core thickness in the circumferential direction is defined at the core inflection point, and the second tapering core has a third core thickness in the circumferential direction at a maximum thereof, wherein the first core thickness and the third core thickness are equal.

14. The core of claim 11, wherein the flow control feature core includes a serpentine flow control core subportion extending in the axial direction and arranged to form a structure in an airfoil body that turns a serpentine cooling air into a direction substantially similar to a flow direction of a resupply air.

15. The core of claim 11, wherein the flow control feature core includes a resupply flow control core subportion extending at least partially in the radial direction and arranged to form a structure in an airfoil body that prevents a resupply air from entering a second serpentine cavity.

16. The core of claim 11, further comprising at least one ejection hole core arranged to form apertures within an airfoil body, the apertures enabling ejection of a portion of air from a second serpentine cavity.

17. The core of claim 16, wherein the at least one air ejection hole core is integrally formed with the core.

18. The core of claim 16, wherein the at least one air ejection hole core is arranged at a position forward of the resupply cavity core.

19. The core of claim 16, wherein the at least one air ejection hole core is configured to form an ejection hole that will eject at least thirty percent of a serpentine cooling air from the second serpentine cavity.

* * * * *